United States Patent [19]
Everts et al.

[11] Patent Number: 5,809,653
[45] Date of Patent: Sep. 22, 1998

[54] ATTACHMENT SYSTEM FOR BATTERY POWERED TOOL

[75] Inventors: Robert G. Everts, Chandler; Kenneth M. Brazell, Phoenix, both of Ariz.

[73] Assignee: Ryobi North America, Inc., Easley, S.C.

[21] Appl. No.: 703,686

[22] Filed: Aug. 27, 1996

Related U.S. Application Data

[63] Continuation of Ser. No. 303,320, Sep. 9, 1994, abandoned.

[51] Int. Cl.$^6$ ................................ A01D 55/00; B25F 3/00
[52] U.S. Cl. ................................ 30/122; 30/208; 30/276; 30/DIG. 1; 15/328; 15/405
[58] Field of Search ....................... 30/276, 347, DIG. 1, 30/122, 208, 264, 272.1, 277.4; 56/12.7; 439/928, 13, 18, 20, 21, 23, 577; 15/328, 405

[56] References Cited

U.S. PATENT DOCUMENTS

| | | |
|---|---|---|
| 2,586,145 | 2/1952 | Breuer et al. . |
| 2,969,559 | 1/1961 | Landis . |
| 3,952,239 | 4/1976 | Owings et al. ................ 30/DIG. 1 |
| 4,052,789 | 10/1977 | Ballas, Sr. ................ 30/276 |
| 4,089,114 | 5/1978 | Doolittle et al. . |
| 4,236,310 | 12/1980 | Muller ................ 30/276 |
| 4,237,610 | 12/1980 | Bradus et al. . |
| 4,269,571 | 5/1981 | Shikutani et al. . |
| 4,413,371 | 11/1983 | Tuggle et al. . |
| 4,463,498 | 8/1984 | Everts . |
| 4,536,914 | 8/1985 | Levine . |
| 4,542,557 | 9/1985 | Levine . |
| 4,829,675 | 5/1989 | Beihoffer ................ 30/276 |
| 5,181,369 | 1/1993 | Everts . |
| 5,594,990 | 1/1997 | Brant et al. ................ 30/122 |
| 5,722,111 | 3/1998 | Sowell et al. ................ 15/405 X |

OTHER PUBLICATIONS

"The Green Machine" brochure, dated Jul. 1983.

*Primary Examiner*—Clark F. Dexter
*Attorney, Agent, or Firm*—Brooks & Kushman P.C.

[57] ABSTRACT

A battery powered tool includes a housing adapted to carry a battery. A shaft having first and second ends is connected to the housing at the first end thereof. A first mechanical joint is adapted for rotatably receiving and supporting an attachment. The first mechanical joint is mounted at the second end of the shaft. The first electrical connector contained within the first mechanical joint is adapted to cooperate with a second electrical connector in the attachment to provide electric thereto. A first electrical conductor extends within the shaft from the housing to the first electrical connector for carrying electric current from the battery to operate the attachment. A second electrical connector engages with the first electrical connector, and is connected to a boom. A second electrical conductor extends within the boom, and the other end of the boom carries a hedge trimmer, a line trimmer, a pruner, a blower or an extension.

6 Claims, 3 Drawing Sheets

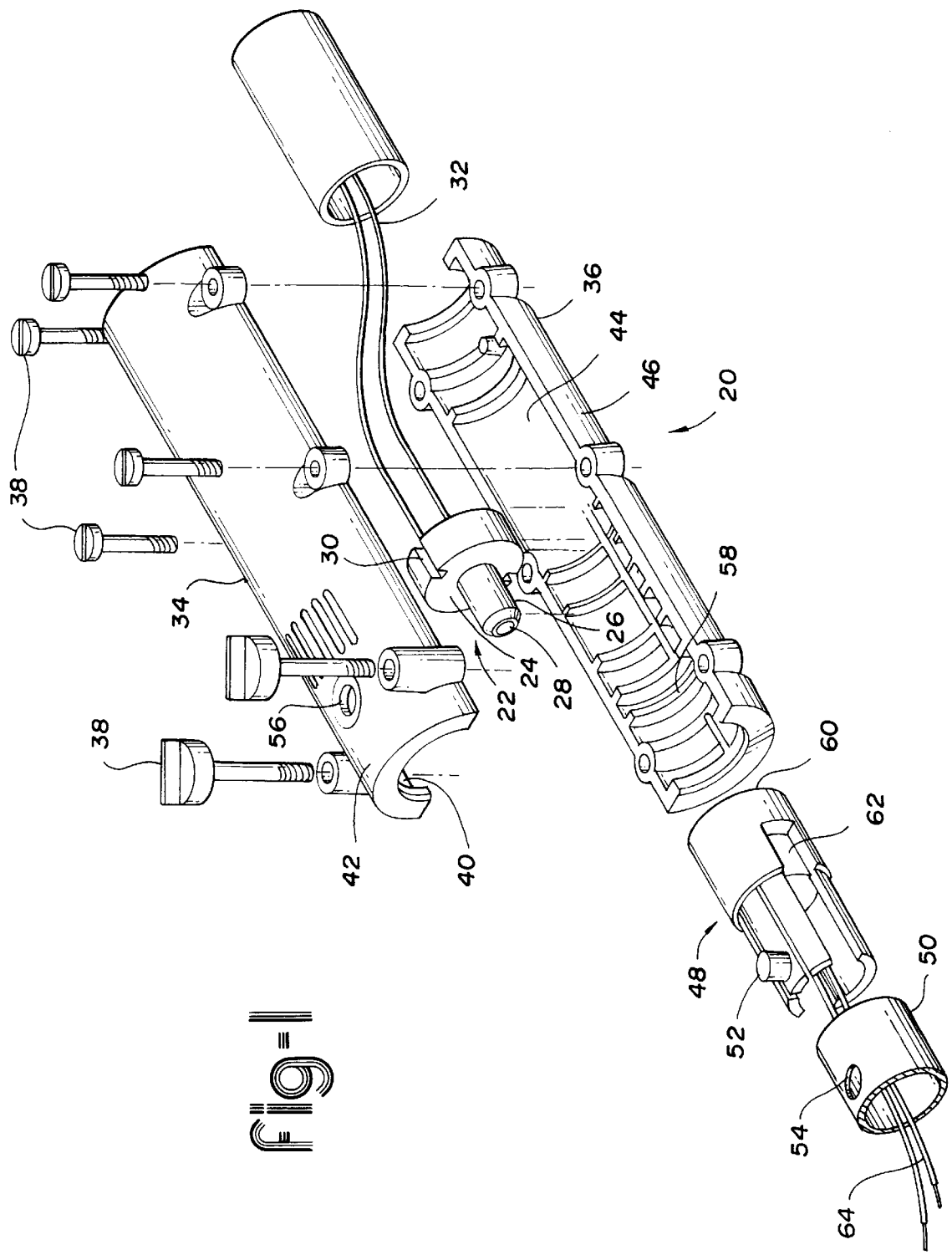

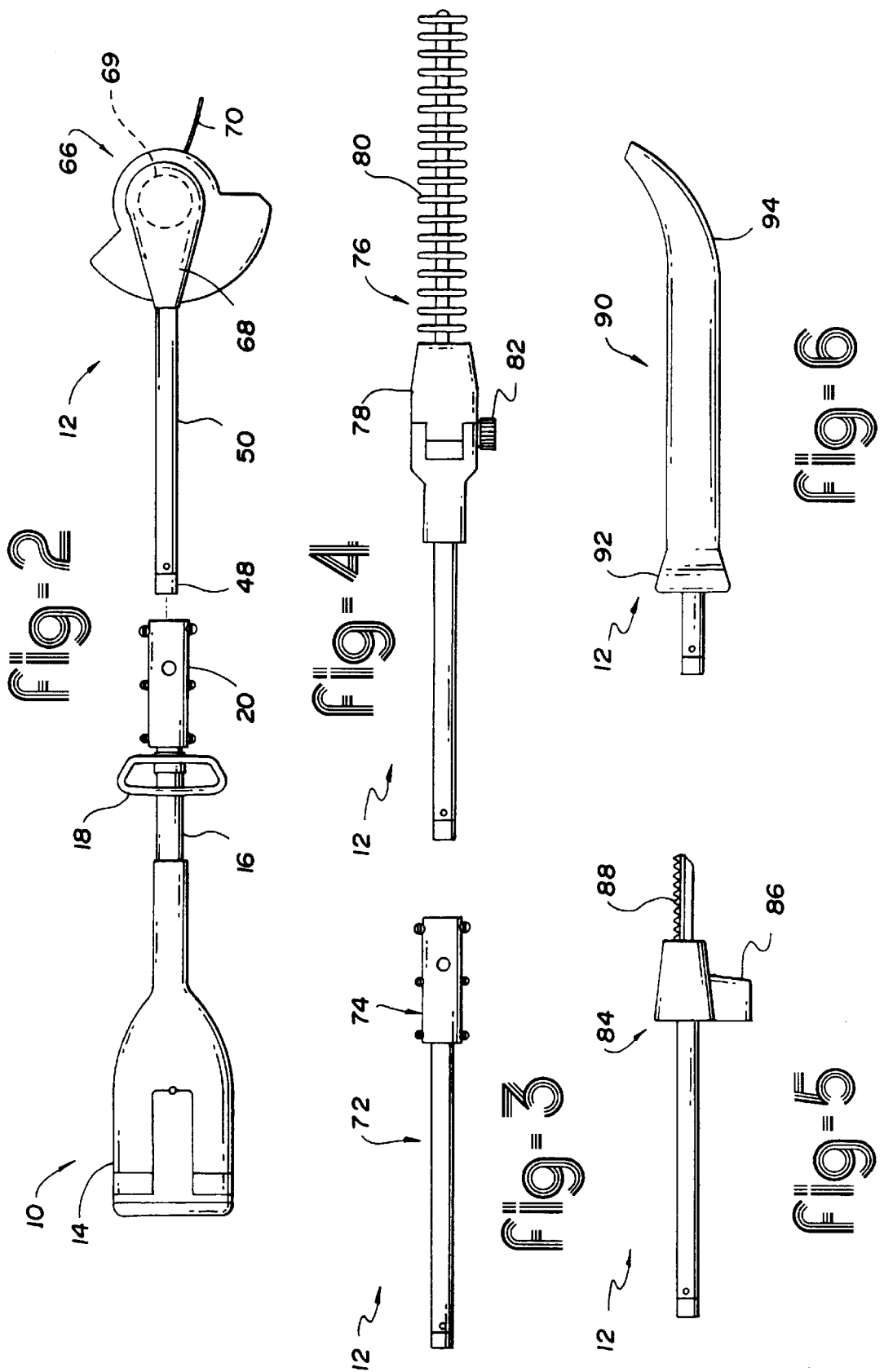

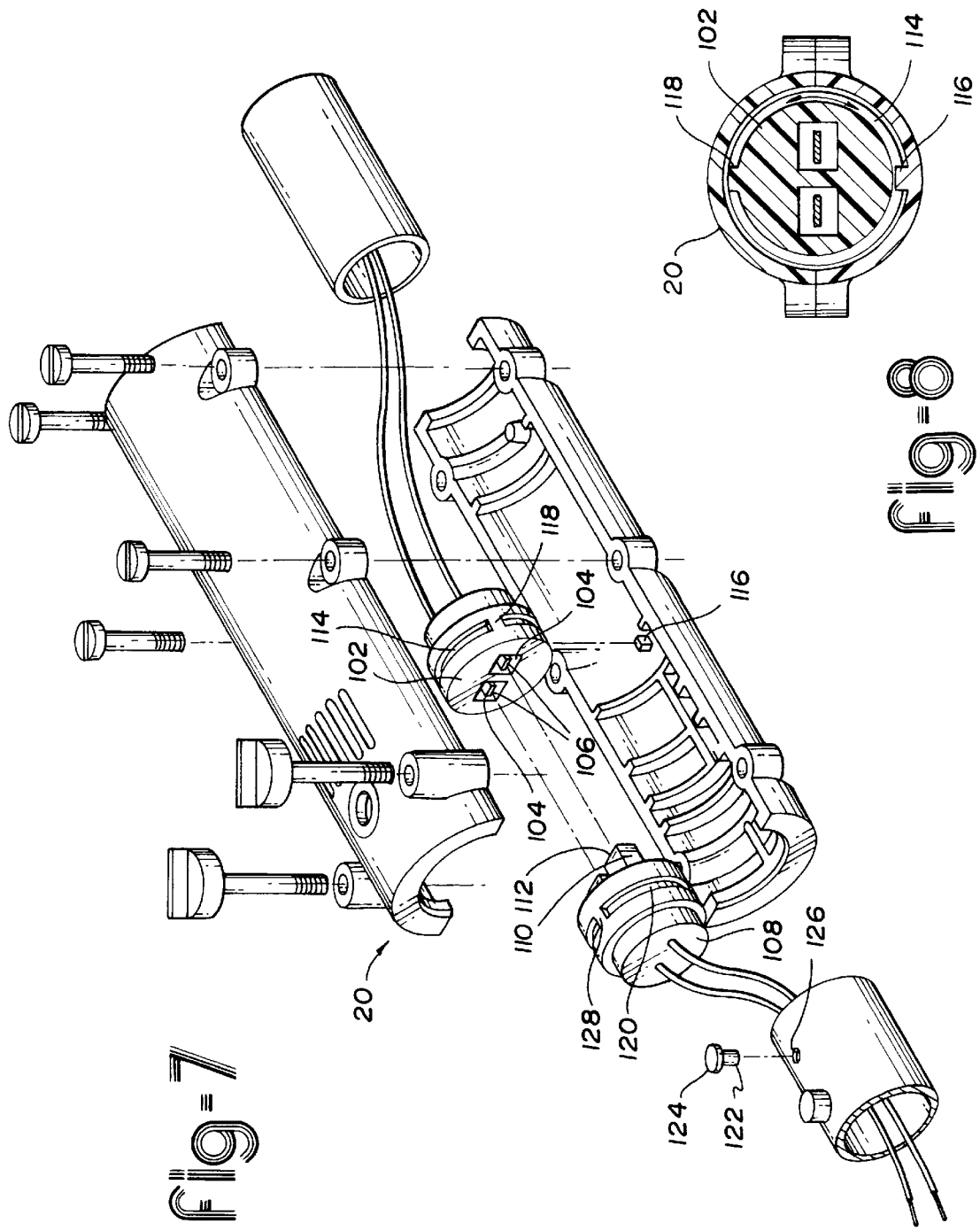

ATTACHMENT SYSTEM FOR BATTERY POWERED TOOL

This is a continuation of application Ser. No. 08/303,320 filed on Sep. 9, 1994, now abandoned.

TECHNICAL FIELD

The present invention relates to an attachment system for a battery powered tool and more particularly to a portable system adaptable to receive a line trimmer, a hedge trimmer, a pruner, a blower or an extension.

BACKGROUND ART

It is well known in the art to provide portable line trimmers, blowers, pruners, and hedge trimmers. Examples of such systems include those disclosed in U.S. Pat. No. 4,884,314, which discloses a portable retractable battery operated blower for removing light debris from sidewalks or driveways. U.S. Pat. No. 4,413,371 discloses a blower attachment for a portable power unit. U.S. Pat. No. 4,089,114 discloses a cordless electric lawn edger having a flexible strand cutting of grass and weeds. U.S. Pat. No. 4,237,610 discloses a portable electrically energized, cordless grass trimmer having a rotatable hub which is adapted to alternatively mount a flexible cutter strip, a line cutter and mechanical counter balance.

Many of these systems work efficiently and provide the desired result of cutting, trimming or blowing. However, it is desirable to develop a system which is adaptable to selectively achieve all of these results while remaining portable, lightweight and easy to use.

U.S. Pat. No. 4,876,490 discloses an electric motor drive system for hand guided tools which attempts to provide this selective capability, in particular for garden appliances but also for tools used at home such as drills and the like. However, this system is awkward because it requires the user to wear a battery-carrying power pack over the user's back, or around the user's waist. This renders the system uncomfortable and impractical.

It is desirable to develop an integrated attachment system which is lightweight, easily maneuverable, and does not require the user to wear a backpack or power belt.

DISCLOSURE OF INVENTION

A battery powered tool includes a housing adapted to carry a battery. A shaft having first and second ends is connected to the housing at the first end thereof. A handle is provided on either the shaft or the housing. A first mechanical joint is adapted for rotatably receiving and supporting an attachment. The first mechanical joint is mounted at the second end of the shaft. A first electrical connector is contained within the first mechanical joint and is adapted to cooperate with a second electrical connector in the attachment to provide electric current thereto. A first electrical conductor extends within the shaft from the housing to the first electrical connector for carrying electric current from the battery to operate the attachment. A second electrical connector is adapted for engagement with the first electrical connector, and is connected to a boom. A second electrical conductor extends within the boom, and the other end of the boom carries a hedge trimmer, a line trimmer, a pruner, a blower or an extension.

Further, a battery powered tooling system includes a housing adapted to carry a battery, and a shaft having first and second ends, connected to the housing at the first end. A first mechanical joint is connected to the second end of the shaft and adapted for rotatably receiving and supporting a removable work member. A first electrical connector is contained within the first mechanical joint. A first electrical conductor extends within the shaft from the housing to the first electrical connector for carrying electric current from the battery to operate the work member. The work member includes a second mechanical joint adapted for engagement with the first mechanical joint, a second electrical connector within the second mechanical joint, a boom having first and second ends mounted at the first end to the second mechanical joint, and a motor housing. An electric motor is mounted within the motor housing, and a second electrical conductor extends within the boom from the second connector to the electric motor for carrying electric current thereto. A work tool is operatively connected to the electric motor and selected from the group consisting of a line trimmer, a hedge trimmer, a pruner and a blower.

Accordingly, an object of the present invention is to provide an integrated battery powered tool which is lightweight, easy to carry and supported by a handle or a pair of handles.

Another object of the present invention is to provide a battery powered tool which is easy and inexpensive to manufacture, and simple to use.

A further object of the present invention is to provide an attachment system for a battery powered tool which is easily balanced and does not require the user to wear a backpack or power belt.

Yet another object of the present invention is to provide a highly dependable attachment system for a battery powered tool which is sufficiently powered to operate efficiently and effectively.

A still further object of the present invention is to provide an attachment system for a battery powered tool which is adaptable for hanging on a battery charger.

These and other objects, features and advantages of the present invention will be more thoroughly understood with reference to the accompanying drawings and description.

BRIEF DESCRIPTION OF THE DRAWINGS

FIG. 1 is an exploded perspective view of a mechanical joint and attachment according to the present invention;

FIG. 2 is a plan view of a battery-powered tool according to the present invention, including a line trimmer;

FIG. 3 is a plan view of an extension for an attachment system according to the present invention;

FIG. 4 is a plan view of a hedge trimmer attachment according to the present invention;

FIG. 5 is a plan view of a pruner attachment according to the present invention;

FIG. 6 is a plan view of a blower attachment according to the present invention;

FIG. 7 is an exploded perspective view of a second embodiment of a mechanical joint and attachment according to the present invention; and FIG. 8 is a vertical cross-sectional view of a second embodiment of a mechanical joint and attachment according to the present invention.

BEST MODES FOR CARRYING OUT THE INVENTION

Referring to FIGS. 1 and 2, a battery powered tool 10 is shown according to the present invention. The tool 10 is adapted to selectively receive attachments 12. The tool includes a housing 14 adapted to carry a battery. A shaft 16 having first and second ends is connected to the housing 14 at the first end thereof. A handle 18 is connected to the shaft 16. A first mechanical joint 20 is connected to the second end of the shaft and adapted for rotatably receiving and supporting the removable attachments 12. A first electrical connector 22 is contained within the first mechanical joint 20 and is adapted to cooperate with a second electrical connector in the attachment 12 to provide electric current thereto. A first electrical conductor 32 extends within the shaft 16 from the housing to the first electrical connector 22 for carrying electric current from the battery to operate he attachment 12.

The first electrical connector 22 includes a generally cylindrical base 24, and a body member 26 connected thereto along a central cylindrical axis. The connector body member 26 has a cylindrical bore therethrough having a cylindrical electrical contact member 28 press-fit therein. The cylindrical contact member 28 is a female-type contact adapted for receiving a male contact, wherein the contacts are adapted to rotate respectively while maintaining electrical contact therebetween. The connector base 24 has a slot 30 formed thereon for cooperation with a rib extending from the first mechanical joint 20. This slot 30 prevents rotation of the first electrical connector 22 with respect to the first mechanical joint 20. This configuration allows the male electrical contact member to rotate with respect to the female first electrical contact member to prevent twisting of the first electrical conductor 32 when the attachment 12 is rotated with respect to the first mechanical joint 20.

The first mechanical joint 20 includes first and second generally half-cylindrical shaped cover plates 34,36 held together by screws 38. The first plate 34 has inner and outer sides 40,42, and the second plate 36 has inner and outer sides 44,46. The two plates are connected together so as to hold the first electrical connector 22 therebetween. A second end of the shaft 16 is held between an end of the cover plates 34,36, in order to secure the first mechanical joint with respect to the shaft.

The attachment 12 includes a second mechanical joint 48 connected to a boom 50. The second mechanical joint 48 has a locating pin 52 resiliently connected hereon. The locating pin 52 is adapted to cooperate with an aperture 54 formed in the boom 50 to secure the second mechanical joint with respect to the boom. The locating pin 52 is adapted to further cooperate with a hole 56 formed in the first plate 34 in order to secure the attachment with respect to the first mechanical joint. The locating pin 52 is further adapted to cooperate with a channel 58 formed on the inner sides 40,44 of the first and second plates. By depressing the locating button 52 below the opening 56 formed in the first plate, the user may twist the attachment 12 with respect to the first mechanical joint. As the attachment is twisted, the locating pin 52 cooperates with the channel 58 to allow rotational movement of the attachment with respect to the first mechanical joint while preventing detachment of the attachment from the first mechanical joint. One end 60 of the second electrical connector 62 includes a male electrical contact member (not shown) is adapted for selective mating within the female contact member 28. The male contact is contained within the second electrical connector 62, which secures the male contact with respect to the attachment. This facilitates continuous electrical contact between the first and second electrical connectors as the attachment is rotated with respect to the first mechanical joint and the locating pin 52 cooperates with the channel 58. A second electrical conductor 64 carries electric current from the second electrical connector 62 to the work tool. As shown in FIGS. 2–6, the work tool is either a line trimmer 66, an extension 72, a hedge trimmer 76, a pruner 84, or a blower 90.

Referring to FIG. 2, the line trimmer 66 includes a motor housing 68, an electric motor 69 mounted within the motor housing, and a flexible strand 70 operatively connected to the electric motor and extending outwardly from the motor housing. In operation, electric current from the battery in the housing 14 travels through the first electrical conductor, the first electrical connector, the second electrical connector, and the second electrical conductor to the electric motor. This electric current operates the electric motor, which actuates rotational movement of the flexible strand 70. In this configuration, the tool may be used for trimming grass, weeds, etc.

As shown in FIG. 3, the extension 72 includes a third connector 74 mounted at the second end of the boom for extending the length of the tool. The third connector 74 is adapted to receive and support any of the second mechanical joints 48 of the attachments herein disclosed. The extension 72 is particularly useful with the hedge trimmer 76 and the pruner 84 attachments. This extension enables the user to trim high bushes or to prune high branches. Furthermore, more than one extension may be added to the tool to significantly increase the length of the tool. The extension is designed so that more than one unit may be fitted together.

Referring to FIG. 4, the hedge trimmer 76 includes a motor housing 78, and a hedge trimmer blade 80 operatively connected to the electric motor and extending outwardly from the motor housing. The hedge trimmer further includes a knob 82 for adjusting the angle of the blade 80 relative to the boom to provide different angles for different hedge trimming needs. For example, when trimming high bushes, the user may adjust the knob 82 so that an angle of approximately 600 exists between the blade 80 and the boom. This enables the user to trim the top portion of bushes more easily.

As shown in FIG. 5, the pruner 84 includes a motor housing 86, an electric motor within the housing, and a pruner blade 88 operatively connected to the electric motor and extending outwardly from the motor housing. This attachment is generally used for pruning branches or limbs from a plant or tree.

Referring to FIG. 6, the blower 90 includes a motor housing 92, an electric motor within the housing, a blower fan operatively connected to the motor, and a blower tube 94 operatively connected to the motor housing for directing air from the blower fan to a desired location outside the system for blowing leaves or debris.

It can be appreciated that this attachment system is adaptable for use with existing wall-hanging battery chargers. These wall mounted battery chargers may receive the housing 14 and provide a voltage differential thereto for recharging the battery. This provides a convenient and safe storage device for the tool.

An alternative embodiment of the first and second electrical connectors is shown in FIGS. 7 and 8. The alternative first electrical connector 102 includes rectangular sockets 104 with contact prongs 106 disposed therein. The second electrical connector 108 includes extension plugs 110 adapted for cooperation with the sockets 104. One end 112 of the extension plugs 110 includes female contact channels (not shown) therein adapted for cooperation with the contact prongs 106 of the first electrical connector. The first electrical connector 102 includes a channel 114 for cooperation with a boss 116 extending from the inner side of the second plate. This boss 116 cooperates with the channel 114 to allow rotational movement of the first electrical connector 102 with respect to a first mechanical joint. The dog 118 prevents the first electrical connector from rotating more than 360° with respect to the first mechanical joint. By preventing rotation in excess of 360°, the first electrical conductor wires are prevented from twisting, tangling, and breaking.

Similarly, the second electrical connector 108 includes a channel 120 for cooperation with a boss 122. The boss 122 is a part of push pin 124, which is adapted to cooperate with a hole 126 formed in the boom. The hole 126 is slightly chamfered in order to pinch and hold the push pin 124 when the push pin is forced into the hole 126 after the second electrical connector 108 has been inserted into the boom and the channel 120 has been aligned with respect to the hole 126. The boss 122 cooperates with the channel 120 to allow rotational movement of the second electrical connector 108 with respect to the boom, while preventing movement of the second electrical connector fore and aft along the central axis of the boom. The dog 128 of the second electrical connector 108 prevents rotation of the second electrical connector with respect to the boom in excess of approximately 360°. As a result of this configuration, a stack-up of selective rotational capability occurs and enables the boom to rotate nearly 720° with respect to the first mechanical joint. In other words, the first electrical connector 102 may rotate up to approximately 360° with respect to the first mechanical joint, as limited by the first dog 118, and the second electrical connector 108 is allowed to rotate up to approximately 360° with respect to the boom, as limited by the second dog 128, thus resulting in potential rotational movement of up to approximately 720° between the first mechanical joint and the boom.

FIG. 8 shows a vertical cross-section of the first electrical connector 102 and the first mechanical joint 20. As shown, the boss 116 cooperates with the channel 114 to allow rotation of the first electrical connector 102 with respect to the first mechanical joint. The dog 118 cooperates with the protrusion 116 to prevent rotational movement of the first electrical connector 102 in excess of 360° with respect to the first mechanical joint 20. In this manner, the user may adjust the relative angle of the tool with respect to the handle and housing. This adjustment capability provides the user with flexibility in adjusting the tool for convenient operation thereof.

While the best modes for carrying out the invention have been described in detail, those familiar with the art to which the invention relates will recognize alternative designs and embodiments for practicing the invention as defined by the following claims.

What is claimed is:

1. A battery powered tool, comprising:
    a housing for carrying a battery;
    a shaft having first and second ends, and connected to said housing at said first end;
    a grip on one of said shaft and said housing;
    a first mechanical joint connected to the second end of said shaft;
    a first electrical connector contained within said first mechanical joint;
    a first electrical conductor extending within said shaft from said housing to said first electrical connector;
    a second mechanical joint removably and rotatably engaged with said first mechanical joint;
    a second electrical connector rotatably and removably engaged with said first electrical connector and contained within said second mechanical joint wherein one of said first and second electrical connectors comprises a contact member which is rotatable with respect to a contact member of the other of said first and second electrical connectors while maintaining electrical contact therebetween;
    a boom having first and second ends, mounted at said first end to said second mechanical joint; and
    a line trimmer mounted at said second end of said boom, including:
        a motor housing;
        an electric motor mounted within said motor housing;
        a flexible strand operatively connected to said electric motor and extending outwardly from said motor housing; and
        a second electrical conductor extending within said boom from said second electrical connector to said electric motor for carrying electric current thereto.

2. The tool of claim 1 wherein said first mechanical joint comprises:
    first and second generally half-cylindrical cover plates having inner and outer sides, and first and second ends thereof, said inner sides of said first and second cover plates being removably engaged with said first electrical connector and said second end of said shaft, and said first cover plate having an opening therethrough;
    a plurality of screws removably engaged with said first and second cover plates for connecting said first and second cover plates to contain said first electrical connector and said second end of said shaft therebetween; and
    said first and second cover plates being removably engaged with said second mechanical joint.

3. The tool of claim 2, further comprising a locating pin resiliently connected to said second mechanical joint for selective engagement within an aperture formed in said boom and further within said opening formed in said first cover plate, such that said locating pin is movable between a first position wherein said locating pin is received in said aperture formed in said boom for securing said second mechanical joint with respect to said boom, and a second position wherein said locating pin is received in both said aperture formed in said boom and said opening formed in said first cover plate to secure said boom with respect to said first mechanical joint.

4. The tool of claim 3, further comprising a channel formed in said inner sides of said first and second cover plates and aligned with said opening formed in said first cover plate for selective cooperation with said locating pin, said locating pin being movable in said channel when said locating pin is in said first position depressed below said opening formed in said first cover plate to facilitate rotation of said second electrical connector, said second mechanical joint and said boom with respect to said first electrical connector and said first mechanical joint.

5. A battery-powered tool system, comprising:
    a housing for carrying a battery;
    a shaft having first and second ends, and connected to said housing at said first end;
    a first mechanical joint connected to the second end of said shaft and rotatably and removably engaged with a removable work member;
    a first electrical connector contained within said first mechanical joint;
    a first electrical conductor extending within said shaft from said housing to said first electrical connector for carrying electric current from said battery to operate said work member; and said work member including:
- a second mechanical joint rotatably and removably engaged with said first mechanical joint;
- a second electrical connector rotatably and removably engaged with said first electrical connector for receiving electric current therefrom;
- a boom having first and second ends, mounted at said first end to said second mechanical joint;
- a motor housing connected to the second end of said boom;
- an electric motor mounted within said motor housing;
- a second electrical conductor extending within said boom from said second electrical connector to said electric motor for carrying electric current thereto; and
- a work tool operatively connected to said electric motor.

6. The battery-powered tool system of claim 5, wherein one of said first and second electrical connectors comprises a contact member which is rotatable with respect to the other of said first and second electrical connectors while maintaining electrical contact therebetween.

* * * * *